US011215501B2

(12) United States Patent
Husar

(10) Patent No.: US 11,215,501 B2
(45) Date of Patent: Jan. 4, 2022

(54) METHOD AND APPARATUS FOR THE TOMOGRAPHY OF SOUND

(71) Applicants: Fraunhofer-Gesellschaft zur Foerderung der angewandten Forschung e.V., Munich (DE); Technische Universitaet Ilmenau, Ilmenau (DE)

(72) Inventor: Peter Husar, Ilmenau (DE)

(73) Assignees: Fraunhofer-Gesellschaft zur Foerderung der angewandten Forschung e.V., Munich (DE); Technische Universitaet Ilmenau, Ilmenau (DE)

( * ) Notice: Subject to any disclaimer, the term of this patent is extended or adjusted under 35 U.S.C. 154(b) by 144 days.

(21) Appl. No.: 16/287,950

(22) Filed: Feb. 27, 2019

(65) Prior Publication Data

US 2019/0195681 A1    Jun. 27, 2019

Related U.S. Application Data

(63) Continuation of application No. PCT/EP2017/071571, filed on Aug. 28, 2017.

(30) Foreign Application Priority Data

Aug. 30, 2016 (DE) ...................... 10 2016 216 352.3

(51) Int. Cl.
  *G01H 9/00* (2006.01)
  *H04R 23/00* (2006.01)
(52) U.S. Cl.
  CPC ............... *G01H 9/00* (2013.01); *G01H 9/002* (2013.01); *H04R 23/008* (2013.01)

(58) Field of Classification Search
  CPC ......... G01H 9/00; G01H 9/002; H04R 23/008
  (Continued)

(56) References Cited

U.S. PATENT DOCUMENTS 6,590,661 B1 * 7/2003 Shnier ...................... G01H 9/00
                                                          356/432
2003/0072407 A1    4/2003 Mihara et al.
(Continued)

FOREIGN PATENT DOCUMENTS

DE          10057922 A1     5/2002
JP         H08280663 A     10/1996
(Continued)

OTHER PUBLICATIONS

Martarelli, Milena et al., "Coherent Tomographic Laser Interferometry for the Aero-acoustic Characterization of Cold Jets", Proceedings of the 16th International Symposium on Applied Laser Techniques to Fluid Mechanics, Lisbon, Portugal, Jul. 2012, 9-12.
(Continued)

*Primary Examiner* — Lisa M Caputo
*Assistant Examiner* — Rose M Miller
(74) *Attorney, Agent, or Firm* — Perkins Coie LLP; Michael A. Glenn

(57) ABSTRACT

A method for the spatial tomography of sound includes the following steps: contactlessly capturing a physical parameter for a first and a second multitude of local regions in space along a first and a second laser beam as well as calculating a voxel model of the sound pressure over time per local region of the first and second multitudes based on the captured physical parameter.

18 Claims, 4 Drawing Sheets

(58) Field of Classification Search
USPC .......................................................... 73/655
See application file for complete search history.

(56) References Cited

U.S. PATENT DOCUMENTS

| | | | |
|---|---|---|---|
| 2010/0162819 A1 | 7/2010 | Araki et al. | |
| 2010/0280826 A1* | 11/2010 | Bakish | G01H 9/00 704/226 |
| 2014/0182383 A1 | 7/2014 | Suzuki et al. | |
| 2015/0053016 A1* | 2/2015 | Sleator | G01H 9/00 73/655 |
| 2015/0312998 A1 | 10/2015 | Tamura et al. | |
| 2016/0138965 A1* | 5/2016 | Biedermann | G01H 9/00 73/655 |
| 2017/0322306 A1* | 11/2017 | Du | G01S 15/06 |

FOREIGN PATENT DOCUMENTS

| | | |
|---|---|---|
| JP | 2007194677 A | 8/2007 |
| JP | 2007295131 A | 11/2007 |
| JP | 2015144809 A | 8/2015 |
| JP | 2016024106 A | 2/2016 |
| WO | 2002067779 A1 | 9/2002 |
| WO | 2010073308 A1 | 7/2010 |

OTHER PUBLICATIONS

Oikawa, Yasuhiro et al., "Sound Field Measurements Based on Reconstruction from Laser Projections", 2005 IEEE International Conference on Acoustics, Speech, and Signal Processing, Mar. 18-23, 2005—Philadelphia, PA, USA, IEEE, Piscataway, NJ, Bd. 4, 18, Mar. 18, 2005, 661-664 XP010792632.

Olsson, Erik et al., "Three-dimensional selective imaging of sound sources", Optical Engineering, 48. Jg., Nr. 3, S., Mar. 2009, 035801-035808.

Tatar, Kourosh et al., "Tomographic Reconstruction of Ultrasound Fields Measured Using Laser Vibrometry", Experimental Analysis of Nano and Engineering Materials and Structures, Springer Netherlands, Extra Materials, 2007, URL: http://extras.springer.com/2007/978-1-4020-6238-4/data/full_papers/189_tat.pdf.

Torras-Rosell, Antoni et al., "Sound field reconstruction using acousto-optic tomography", The Journal of the Acoustical Society of America, 2012, 131, Jg., Nr. 5 S., Feb. 2012, 3786-3793.

Turbell, Henrik, "[Uploaded in 4 parts] Cone-Beam Reconstruction Using Filtered Backprojection", Institute of Technology, Linköpings Universitet, Department of Electrical Engineering, Science and Technology Dissertation No. 672, 2001, pp. 1-177, pp. 1-61.

* cited by examiner

METHOD AND APPARATUS FOR THE TOMOGRAPHY OF SOUND

CROSS-REFERENCES TO RELATED APPLICATIONS

This application is a continuation of International Application No. PCT/EP2017/071571, filed Aug. 28, 2017, which is incorporated herein by reference in its entirety, and additionally claims priority from German Application No. DE 10 2016 216 352.3, filed Aug. 30, 2016, which is incorporated herein by reference in its entirety.

BACKGROUND OF THE INVENTION

Embodiments of the present invention refer to a method and an apparatus for (computer) tomography of sound. Embodiments refer to capturing sound by means of laser.

There have been arrangements and methods for recording sound for many years. The most frequently used technologies are based on a microphone for the audible sound and/or on piezoelectric transducers particularly for ultrasound. The laser microphone is used for capturing sound at surfaces of (sufficiently) solid materials.

A disadvantage of the existing methods is that electroacoustic transducers need a direct contact to the medium (gases, liquids, solids) on site. For example, for capturing the noise level in the vicinity of industrial machines, the entire space around the machine has to be covered with a microphone in order to capture the spatial noise distribution. This results in considerable static uncertainty due to the fact that the sound field may change considerably during the measurement, so that the spatial capturing is unreliable on the temporal axis. In addition, the measurement apparatus often strongly affects the sound field to be measured. In the case of ultrasound transducers, this is compounded by the fact that they need a direct physical contact to the material. In fact, the ultrasound transducer has to be placed on the material to be examined, so that a mechanical force connection may be created.

With laser, the sound at the surface of solid or liquid materials may be captured according to various principles (travel time measurement, interferometry). However, this technology does not work if sound is to be captured in the air or other light-transmissive materials, since there is effectively no boundary layer for the radiation reflection of sound. Another disadvantage is that sound cannot be captured across a spatial area or a spatial segment. Thus, there is a need for an improved approach.

SUMMARY

According to an embodiment, a method for the spatial tomography of sound may have the steps of: contactlessly capturing a physical parameter by means of a laser scanner for a first multitude of local regions in space over time along a first laser beam; contactlessly capturing the physical parameter by means of the laser scanner for a second multitude of local regions in space over time along a second laser beam; contactlessly capturing the physical parameter by means of the laser scanner for a third multitude of local regions in space over time along a third laser beam; calculating a voxel model of the sound pressure over time per local region of the first, second and third multitudes based on the captured physical parameters for the first, second and third multitudes of local regions; wherein contactlessly capturing is carried out in a transmissive manner with transmission of a medium at least along the first, second and third laser beams; wherein the sound pressure may be described along the first and second laser beams per point in time through a line integral, wherein each point on the line integral corresponds to a local region; wherein the first and second laser beams cross each other so that a common plane is spanned, wherein the laser scanner has a laser source emitting several laser beams in a conical manner through the space, and a plurality of laser detector elements.

Another embodiment may have a non-transitory digital storage medium having a computer program stored thereon to perform the method for the spatial tomography of sound, having the steps of: contactlessly capturing a physical parameter by means of a laser scanner for a first multitude of local regions in space over time along a first laser beam; contactlessly capturing the physical parameter by means of the laser scanner for a second multitude of local regions in space over time along a second laser beam; contactlessly capturing the physical parameter by means of the laser scanner for a third multitude of local regions in space over time along a third laser beam; calculating a voxel model of the sound pressure over time per local region of the first, second and third multitudes based on the captured physical parameters for the first, second and third multitudes of local regions; wherein contactlessly capturing is carried out in a transmissive manner with transmission of a medium at least along the first, second and third laser beams; wherein the sound pressure may be described along the first and second laser beams per point in time through a line integral, wherein each point on the line integral corresponds to a local region; wherein the first and second laser beams cross each other so that a common plane is spanned, wherein the laser scanner has a laser source emitting several laser beams in a conical manner through the space, and a plurality of laser detector elements, when said computer program is run by a computer.

According to another embodiment, an apparatus for the tomography of sound may have: a unit for contactlessly capturing a physical parameter by means of a laser scanner for a first multitude of local regions in space over time along a first laser beam; contactlessly capturing the physical parameter by means of the laser scanner for a second multitude of local regions in space over time along a second laser beam; contactlessly capturing the physical parameter by means of the laser scanner for a third multitude of local regions in space over time along a third laser beam; a calculation unit for calculating a voxel model of the sound pressure over time per local region of the first, second and third multitudes based on the captured physical parameters for the first, second and third multitudes of local regions; wherein the laser scanner has a laser source emitting several laser beams in a conical manner through the space, and a plurality of laser detector elements, wherein the sound pressure along the first and second laser beams may be described per point in time, wherein each point on the line integral corresponds to a local region; wherein the first and second laser beams cross each other so that a common plane is spanned; wherein contactlessly capturing is carried out in a transmissive manner with transmission of a medium at least along the first, second and third laser beams.

Embodiments of the present invention provide a method for the spatial tomography of sound. The method includes the following steps: contactlessly capturing a physical parameter (such as a local refractive index, a local sound pressure, a local density, a local temperature and/or a local optical spectrum) by means of a laser scanner for a multitude of local regions in space over time along a first laser beam and for a second multitude of local regions in space over time along a second laser beam. Here, the two laser beams may cross each other so that a common plane is spanned. Based on the captured physical parameters for the first and second multitudes of local regions, a voxel model of the sound pressure is calculated in a third step.

Embodiments of the present invention are based on the finding that, with the aid of a laser scanner (when used in a transparent media such as air), a physical parameter may be optically captured along the laser beam, which may be described by means of a line integral, for example. This physical parameter per point (per local region) allows for a conclusion to be drawn about local pressure conditions and, consequently, also about the locally existing sound pressure. This local sound pressure per region may be spatially resolved similarly to the computer-tomography method. Thus, with only two measurements along two laser beams at different spatial angles, the sound in the plane may be measured and/or reconstructed. Advantageously, a sufficient number of line projections (e. g. 360 per plane) are used in order to spatially resolve the sound field with sufficient accuracy. As a result, this has the advantage that a section of the sound field may be temporally and spatially resolved. Another advantage is that the sound projection onto the sound field, in contrast to previous methods, has no feedback effect. This means that the sound field is not affected by the measurement arrangement, as is the case with mechanical-electrical transducers located within the sound field and therefore effectively stopping the field propagation at their positions.

According to further embodiments, the step is therefore repeated for further multitudes of local regions along further laser beams in the same plane in order to spatially capture the plane completely. By means of two, three or more laser scans in the same plane, a two-dimensional voxel model is created, wherein each point of the voxel model describes the sound pressure per point in time in the plane. The use of four or more laser beams has the advantage of better fault robustness.

According to further embodiments, further multitudes of local regions may be captured along a laser beam penetrating the first plane in order to extend the voxel model in the three-dimensional planes, so that each point in the voxel model describes the sound pressure per point in time in space.

Since all embodiments assume only one point in time, it should be noted here that this method may of course also be repeated continuously over time in order to enable a temporal resolution.

According to embodiments, the above-mentioned laser scanner comprises at least one laser source emitting a directed laser beam through the space or emitting several laser beams in a conical manner through the space, and a plurality of laser detector elements forming a laser detector. According to further embodiments, several scanners may be used to scan the several spatial angles. According to embodiments, these several laser scanners, i.e. the laser sources and the multitude of laser detector elements, may be arranged in a circle or in an oval so that they enclose the plane in which the sound is to be scanned. Here, it is assumed that the laser scanners function by means of transmission. In this case, the multitude of laser sources is advantageously arranged opposite the associated laser detector elements. In order to facilitate the applications, the opposite arrangement may be ignored, and a reflector may be used instead. It would also be conceivable to not only use transmission, but also scattering.

A further embodiment refers to a computer program for performing one of the abovedescribed methods.

A further embodiment refers to an apparatus for the tomography of sound. The same includes means for capturing the first and second multitude of local regions along the first and second laser beams by means of a laser scanner, i. e. a first and a second laser scanner, for example, as well as a calculation unit for determining the voxel model.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
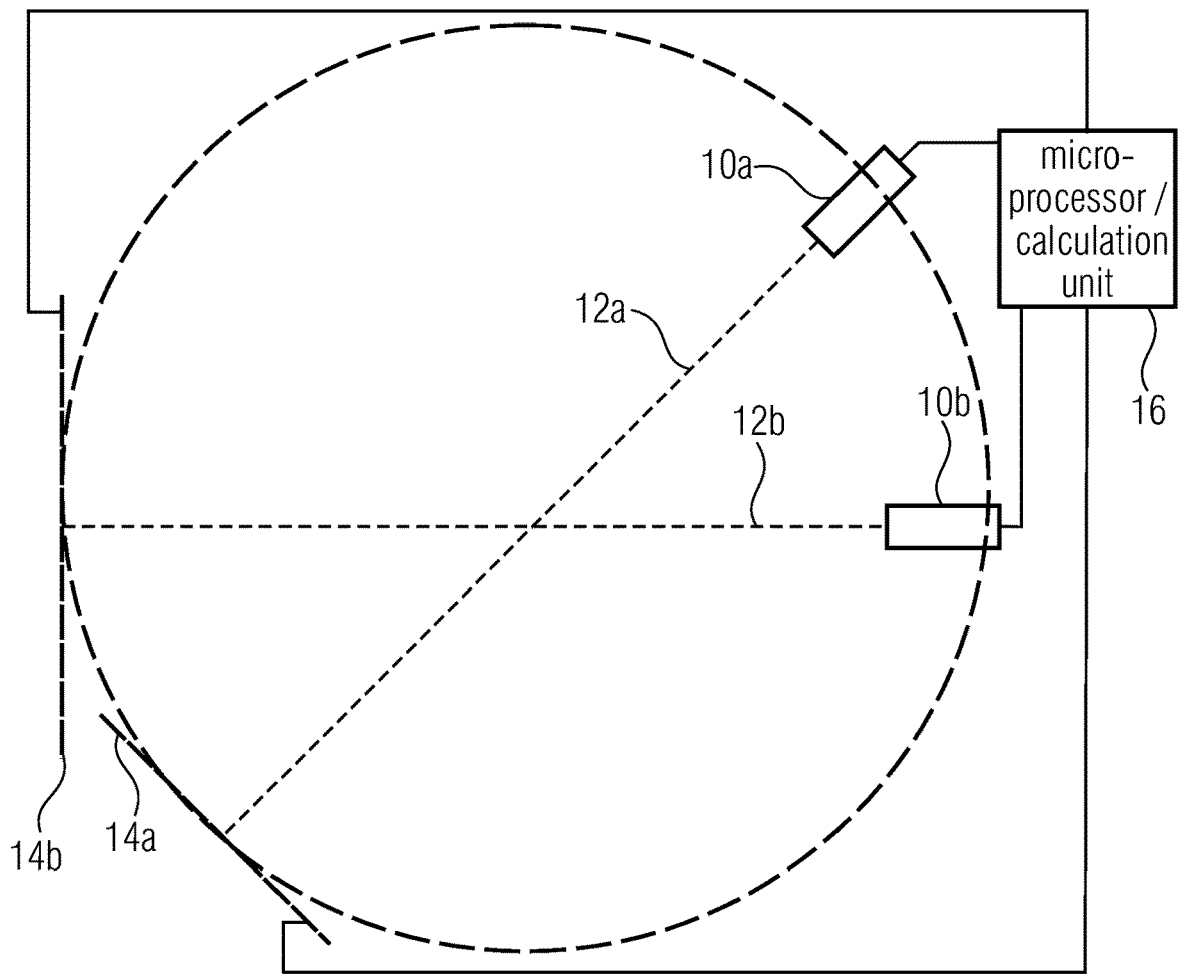
FIG. 1a shows an exemplarily arrangement of a laser scanner for reconstructing the principle of the tomography of sound according to an embodiment.

Before embodiments of the present invention are subsequently described in detail based on the figures, it is to be noted that that elements and structures having the same effects are denoted with the same reference numerals so that their description may be applied to each other and/or may be interchanged.

FIG. 1a shows an arrangement of laser scanners (reference numerals 10a+14a and 10b+14b), here two laser scanners 10a and 10b with associated laser detectors 14a and 14b. Each laser 10a and 10b emits a laser beam 12a and 12b, respectively, which may then be detected by an oppositely arranged laser detector 14a and 14b. A space having a transparent medium in which sound is to be contactlessly detected with the aid of the two laser scanners 10a+14a and 10b+14b is spanned between the respective lasers 10a and 10b and the respective detectors 14a and 14b.

Sound in space manifests itself in the form of local pressure variations, i. e. a local change of the physical parameters. This local pressure variation may be captured by means of a laser, e. g. based on the local refractive index, an optically measurable local density, or a local optical spectrum, or a change of these parameters. Based on the laser scan by means of the two laser scanners 10a+14a and 10b+14b, a conclusion may be drawn about the physical parameters and therefore about the local sound pressure. The first laser scanner 10a+14a is configured to measure all local regions along the laser beam 12a. Here, the optical parameters of the medium to be measured may be captured as a line integral along the laser beams 12a and 12b, since the laser beam captures a sufficiently strong dependence on the local sound-induced pressure change of the medium (generally: local pressure conditions) for the measurement.

Consequently, two independent line integrals are determined by means of the two different spatial angles of the two laser scanners 10a+14a and 10b+14b, each line integral describing the sound distribution along the respective laser beam 12a or 12b. Here, it is to be noted that each point on the line integral represents a sound pressure for the respective local region along the respective laser beam 12a and 12b. If the two laser beams 12a and 12b cross each other, an area is spanned by means of the two line integrals, so that the sound distribution in the plane may be determined for the area at least in the region of the laser beams 12a and 12b.

Figure 1B:
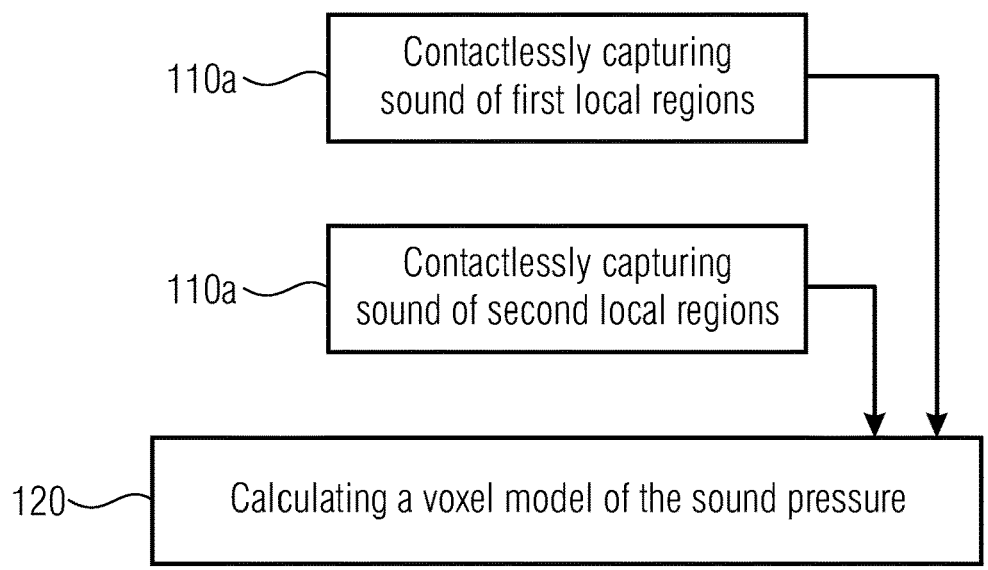
FIG. 1b shows a schematic block diagram of a method in the tomography of sound according to an embodiment.

Now that the arrangement of the laser scanners 10a+14a and 10b+14b has been described with respect to the space in which the sound is to be scanned, the process of the tomography of sound will be described. FIG. 1b shows the corresponding method 100 for the tomography of sound. The same includes the three base steps 110a and 110b and 120.

In the steps 110a and 110b, contactlessly capturing a physical parameter by means of a laser scanner is performed. In step 110a, the laser scanner 10a+14a is used to determine the physical parameters for a first multitude of local regions in space (over time) along the first laser beam 12a, while in step 110b, the laser scanner 10b+14b is used to capture the physical parameters for a second multitude of local regions along the second laser beam 12b.

Here, per each step 110a and 110b, a line integral indicating the physical parameters for the multitude of local regions along the two laser beams 12a and 12b is obtained.

The two line integrals may be combined so that a voxel model of the sound pressure over time may be determined based on the same. Referring to the method 100, the block indicated with reference numeral 120 represents this step. In the event that the laser beams 12a and 12b cross each other, a two-dimensional voxel model is determined. This method may be compared to the computer tomography known from the area of radiography.

In order to enrich the information density in this plane, according to further embodiments, it makes sense to perform further laser scans with different spatial angles (advantageously in the same plane) in order to further improve the spatial resolution of the voxel model.

According to further embodiments, the two-dimensional voxel model for one plane may also be extended into the three-dimensional space if the spatial angles are not only varied in the plane, but also at an angle to the plane. With this, a three-dimensional voxel model may be obtained. If a sufficient number of line projections are obtained, it is possible to calculate the local pressure changes in a spatially resolved manner so that a projection of the spatial sound field is available in real-time.

Figure 2:
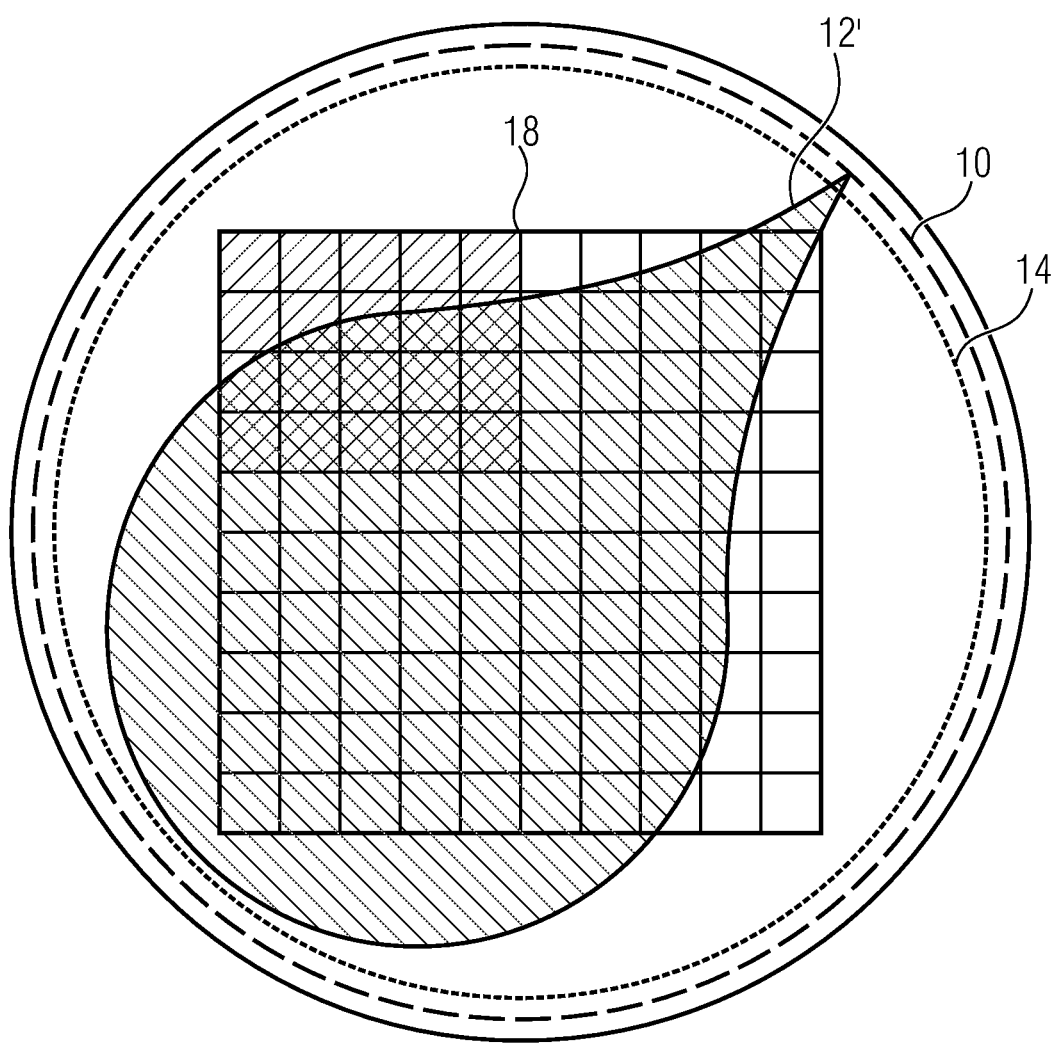
FIG. 2 shows a schematic illustration of a further arrangement for the tomography of sound according to a further embodiment.

Referring to FIG. 2, an extended embodiment of an arrangement for the tomography of sound is explained.

FIG. 2 shows a square matrix 18 of symmetrically arranged voxels (local regions, here 10×10 voxels) for which the sound field is to be determined. A plurality of laser sources is arranged around this projection surface 18 of the sound field in an annular manner, i. e. along the dotted ring denoted with the reference numeral 10. Each laser source generates a spatially shaped beam distribution 12', i. e. laser beams arranged in a conical manner. In addition, a multitude of laser detector elements is also annularly arranged in a further ring having the reference numeral 14. Here, an opposing arrangement of the laser detector elements 14 and the laser sources 10 is assumed, so that the laser beams (cf. 12') may be captured by the photo detectors 14 after passing through the voxels (cf. matrix 18). At this point, it is to be noted that an oval or a square or any other arrangement may be used for the lasers 10 and laser detectors 14 instead of a circular/annular arrangement. As a rule, the arrangement is selected in such a way that as many voxels (cells of the matrix 18) as possible may be illuminated with the radiation lobe of the laser sources 10. In this case, the transmitted light (line integral of the radiation) is received by the (advantageously) oppositely arranged laser detector units 14.

Since the laser sources 10 are switched in the time-division multiplexing in such a way that a complete passage along the ring 10 corresponds to the acoustically-needed scanning period, there is a sufficient number of spatial line projections for each acoustical scanning period. This means that a passage of the laser scan may only last as long as the sampling period resulting from the sampling rate. The local sound pressure change is determined from the multitude of the line projections, e. g. by back projection.

With the proposed method and the arrangement, acoustic sound in space may be contactlessly projected in real-time onto any surface or spatial structure.

By using laser beams, the geometric dimensions of the recording system may move over several decades: from a few centimeters up to a few kilometers (six and more decades of spatial dynamic range).

In the above embodiments, even if it is assumed that the arrangement of the laser sources 10 and the laser detectors 14, or the respective laser detector elements (pixel), is configured in to be opposite, so that the optical parameters may be determined in a transmissive manner, it is to be noted at this point that, according to further embodiments, a reflected measurement may be carried out. Here, a reflector reflecting back the laser beams is provided opposite to the laser sources, so that the laser beams may again be received on the side of the laser sources. In addition, the reflective measurement has the advantage that the entire space does not have to be captured by laser sources and photodetectors. The only constraint is that a reflective surface is provided behind the space.

According to further embodiments, the laser beams may radiate invisibly, e. g. they may be infrared lasers, so that a field measurement that is completely (physically, physiologically, psychologically) residue-free is possible.

According to further embodiments, the radiation source referred to as laser herein, which usually works in the UV, IR or visible range, may also be based on a technology other than laser technology. In other words, this means that a laser or laser scanner is generally understood to be a radiation source (or a radiation source used for measuring purposes) that is suitable for optically scanning physical parameters in space.

Figure 3A:
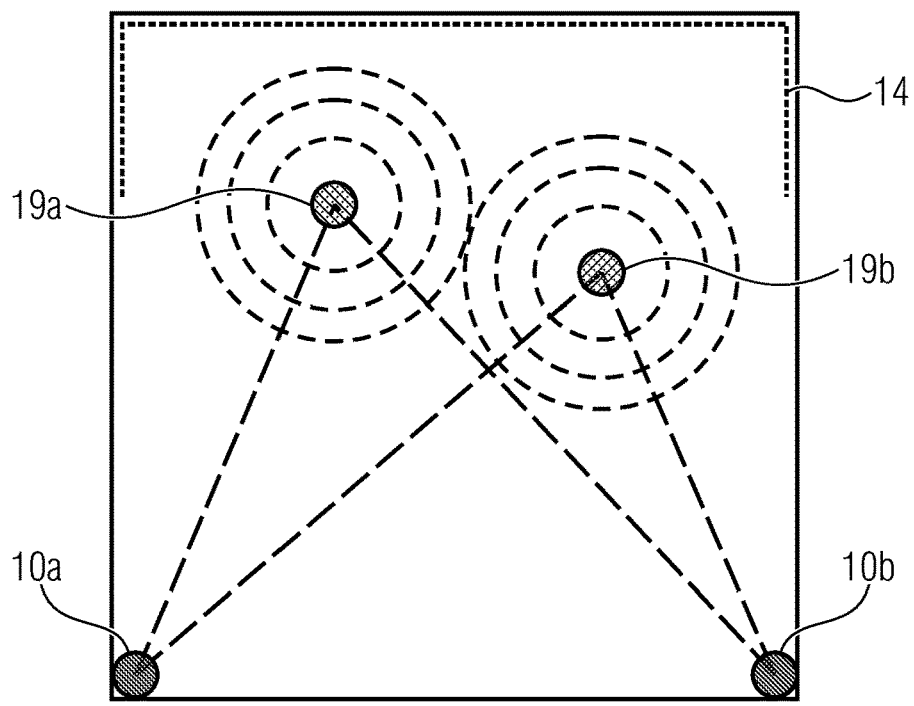
FIG. 3a, 3b show a schematic illustration to highlight the principle of the tomography of sound in a specific application.
Figure 3B:
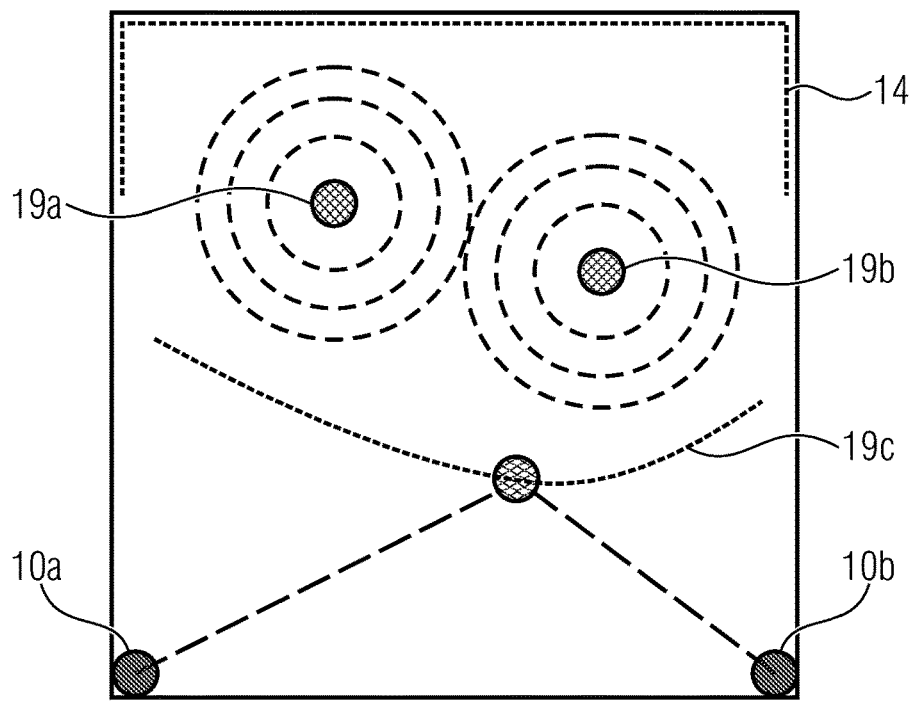
Figure 4:
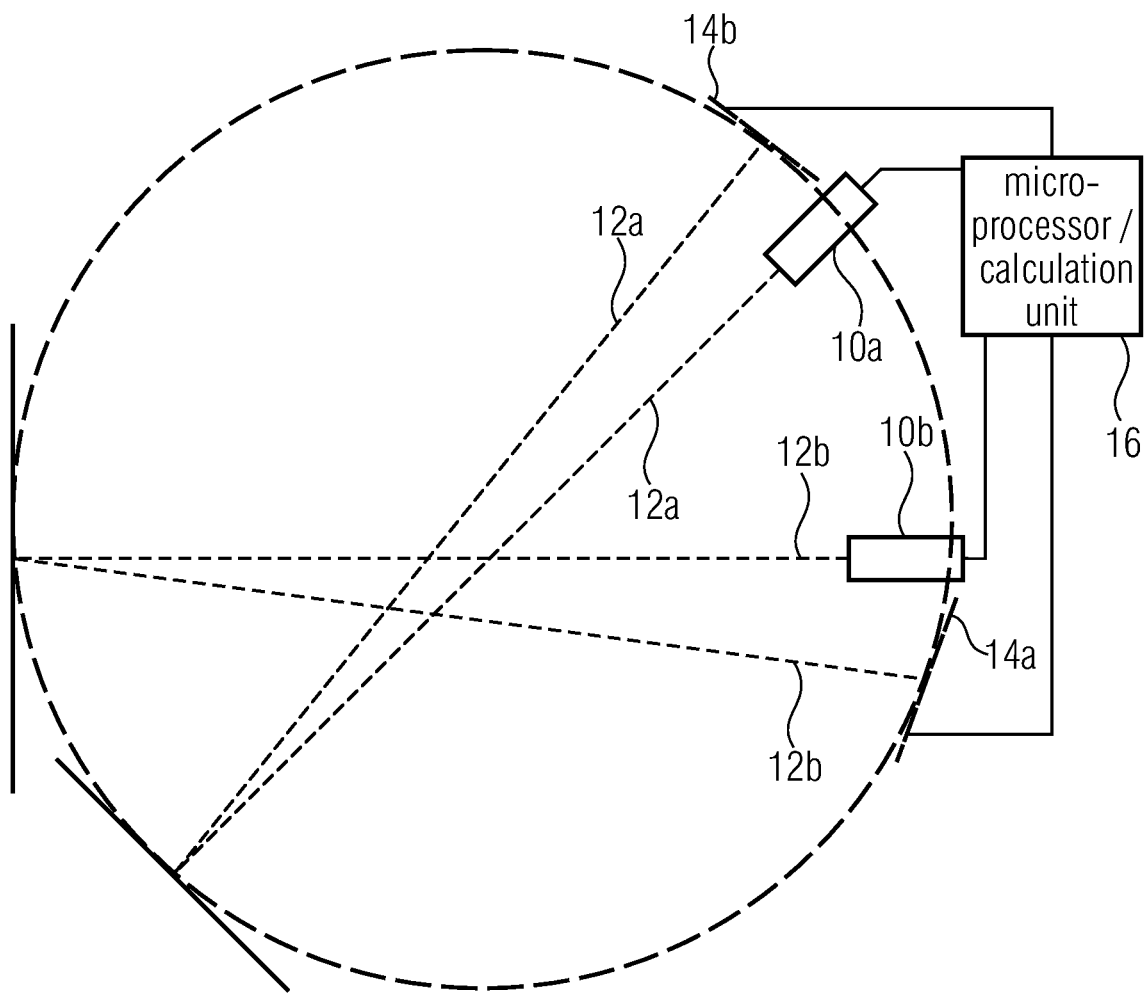
FIG. 4 shows a schematic illustration of a further arrangement for the tomography of sound according to a further embodiment.

Referring to FIGS. 3a and 3b, an implementation example is illustrated. The sound sources (see reference numerals 19a and 19b) generate mechanical waves in space and therefore wave fronts in a spatially simultaneous manner in sum. The spatially and temporally resolved activity (the local sound pressure of the sound sources 19a and 19b) is captured by means of the radiation sources 14a and 14b and by means of spatially distributed radiation detector elements, which are illustrated by means of the dotted line 14. At this point, it is to be noted that the radiation sensors 14 may be arranged at any location in space. Furthermore, it is to be noted that the radiation sensors 14 may be used in combination with the laser source 10a and also in a combination with the laser source 10b, thus, forming the laser scanner.

The sound sources 19a and 19b are reconstructed directly based on the voxel model determined as explained above in an inverse method or processed at an identical location with identical temporal progression. With this process, there are no differences with regard to the wave field, not even with changed space conditions or moved objects. This fact follows from the reconstruction of the sound source. Based on this, a further implementation example is illustrated in FIG. 3b. With the same arrangement of the sound sources 19a and 19b and the radiation sources 10a and 10b as well as the radiation detectors 14, it is not the sound sources 19a and 19b that are reconstructed as in the embodiment of FIG. 3a, but the sound pressure created by the sound sources 19a and 19b along the line 191. This is also possible based on the voxel model, since the voxel model contains the sound pressure in the space between the laser sources 10a and 10b and the detectors 14. In this way, the spatialtemporal sound pressure may be reconstructed directly on site. This also ensures a complete independence from various movements.

Basically, laser-based sound field capturing may be used wherever the medium is sufficiently transmissive for the radiation used, and at least one optical parameter of the medium is sound-pressure dependent. For example, by tri-angulating using two (or more) surface projections, a sound source that is in air or water or is moving could be located. It is possible to measure the internal pressure distribution in translucent materials (glass, plastic, crystals) in order to check the quality of the glass temperature, for example.

Since several laser scans (with three or more laser beams) are advantageously used, there are different possibilities for the selection of the hardware: For example, three measurements (e. g. with different angles) could be carried out with one laser scanner. Furthermore, it would also be conceivable to use three laser scanners. An additional variation would be to perform several measurements with at least two laser beams, respectively.

According to embodiments, this means that contactlessly capturing is carried out in transmissions (i.e. in a transmissive manner) with transmission of the medium along the first and second laser beam. Here, contactlessly capturing may include the sub-step of determining a transmission characteristic (transmittance) of the transmitted medium and/or determining a scattering property (scattering degree or characteristic) of the transmitted medium.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed. Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for the spatial tomography of sound, comprising:
    contactlessly capturing a physical parameter by means of a laser scanner for a first multitude of local regions in space over time along a first laser beam;

contactlessly capturing the physical parameter by means of the laser scanner for a second multitude of local regions in space over time along a second laser beam;
contactlessly capturing the physical parameter by means of the laser scanner for a third multitude of local regions in space over time along a third laser beam;
calculating a voxel model of the sound pressure over time per local region of the first, second and third multitudes based on the captured physical parameters for the first, second and third multitudes of local regions;
wherein contactlessly capturing is carried out in a transmissive manner with transmission of a medium at least along the first, second and third laser beams;
wherein the sound pressure may be described along the first and second laser beams per point in time through a line integral, wherein each point on the line integral corresponds to a local region; wherein the first and second laser beams cross each other so that a common plane is spanned,
wherein the laser scanner comprises a laser source emitting several laser beams in a conical manner through the space, and a plurality of laser detector elements.

2. The method according to claim 1, wherein the first and second laser beams cross each other, so that the first and second multitudes of local regions are arranged in a common plane.

3. The method according to claim 2, wherein the voxel model is two-dimensional and describes the sound pressure per point in time in the plane.

4. The method according to claim 1, wherein contactlessly capturing the physical parameter is repeated for at least one further multitude of local regions in space over time along a further laser beam; and
wherein calculating the voxel model is carried out based on the captured physical parameters for the first, second, third and further multitudes of local regions.

5. The method according to claim 1, wherein the first, second and third laser beams comprise different spatial angles so that at least two planes are spanned, and cross each other in space.

6. The method according to claim 1, wherein the voxel model is three-dimensional and describes the sound pressure per point in time in space.

7. The method according to claim 1, wherein capturing the physical parameter comprises capturing a local refractive index, a local sound pressure, a local density, a local temperature and/or a local optical spectrum; and/or
wherein contactlessly capturing over time comprises capturing a change of the physical parameter.

8. The method according to claim 1, wherein, in contactlessly capturing by means of the laser scanner, a local refractive index is captured.

9. The method according to claim 1, wherein the laser scanner comprises a plurality of laser sources and a plurality of laser detector elements that are distributed in space.

10. The method according to claim 9, wherein the plurality of laser sources and the plurality of laser detector elements are arranged in a circle or in an oval.

11. The method according to claim 9, wherein the plurality of laser sources is arranged opposite to the plurality of laser detector elements so that the respective physical parameter is detected in a transmission.

12. The method according to claim 1, wherein the physical parameter is detected based on scattering.

13. The method according to claim 8, wherein, in contactlessly capturing, the laser beam of the laser scanner is reflected through the space by means of a reflector.

14. The method according to claim 1, wherein contactlessly capturing comprises determining a transmission characteristic of the transmitted medium and/or determining a scattering characteristic of the transmitted medium.

15. A non-transitory digital storage medium having a computer program stored thereon to perform the method for the spatial tomography of sound, comprising:
contactlessly capturing a physical parameter by means of a laser scanner for a first multitude of local regions in space over time along a first laser beam;
contactlessly capturing the physical parameter by means of the laser scanner for a second multitude of local regions in space over time along a second laser beam;
contactlessly capturing the physical parameter by means of the laser scanner for a third multitude of local regions in space over time along a third laser beam;
calculating a voxel model of the sound pressure over time per local region of the first, second and third multitudes based on the captured physical parameters for the first, second and third multitudes of local regions;
wherein contactlessly capturing is carried out in a transmissive manner with transmission of a medium at least along the first, second and third laser beams;
wherein the sound pressure may be described along the first and second laser beams per point in time through a line integral, wherein each point on the line integral corresponds to a local region; wherein the first and second laser beams cross each other so that a common plane is spanned,
wherein the laser scanner comprises a laser source emitting several laser beams in a conical manner through the space, and a plurality of laser detector elements, when said computer program is run by a computer.

16. An apparatus for the tomography of sound, comprising:
a unit for contactlessly capturing a physical parameter by means of a laser scanner for a first multitude of local regions in space over time along a first laser beam; contactlessly capturing the physical parameter by means of the laser scanner for a second multitude of local regions in space over time along a second laser beam; contactlessly capturing the physical parameter by means of the laser scanner for a third multitude of local regions in space over time along a third laser beam;
a calculation unit for calculating a voxel model of the sound pressure over time per local region of the first, second and third multitudes based on the captured physical parameters for the first, second and third multitudes of local regions;
wherein the laser scanner comprises a laser source emitting several laser beams in a conical manner through the space, and a plurality of laser detector elements;
wherein the sound pressure along the first and second laser beams may be described per point in time, wherein each point on the line integral corresponds to a local region; wherein the first and second laser beams cross each other so that a common plane is spanned;
wherein contactlessly capturing is carried out in a transmissive manner with transmission of a medium at least along the first, second and third laser beams.

17. The apparatus according to claim 16, wherein the unit for contactlessly capturing comprise one or several laser scanners configured to determine a local refractive index at the first or the second multitude of local regions in space.

18. The apparatus according to claim 16, wherein the laser scanner comprises at least one laser source configured for emitting a directed laser beam through the space or for conically emitting several laser beams through the space, and one or several laser detector elements configured for detecting the directed laser beam or the several laser beams.

* * * * *